United States Patent [19]
Kondo et al.
[11] Patent Number: 4,707,035
[45] Date of Patent: Nov. 17, 1987

[54] SYNTHETIC RESIN VEHICLE WHEEL COVER

[75] Inventors: Isao Kondo; Yasuyuki Koguro, both of Kanagawa, Japan

[73] Assignee: Marui Industry Co., Ltd., Tokyo, Japan

[21] Appl. No.: 894,391

[22] Filed: Aug. 12, 1986

Related U.S. Application Data

[63] Continuation of Ser. No. 706,887, Mar. 1, 1985, abandoned.

[30] Foreign Application Priority Data

Apr. 14, 1984 [JP] Japan ............................ 59-54127[U]

[51] Int. Cl.$^{4}$ ................................................ B60B 7/02
[52] U.S. Cl. ................................ 301/37 P; 301/37 S
[58] Field of Search ............................ 301/37 P, 37 S

[56] References Cited

U.S. PATENT DOCUMENTS

| | | | |
|---|---|---|---|
| 2,624,626 | 1/1953 | Lyon | 301/37 C |
| 3,876,257 | 4/1975 | Buerger | 301/37 C |
| 4,004,837 | 1/1977 | Main | 301/37 P |
| 4,133,583 | 1/1979 | Spisak | 301/37 P X |
| 4,382,635 | 5/1983 | Brown et al. | 301/37 P X |
| 4,457,560 | 7/1984 | Rowe et al. | 301/37 P |
| 4,457,561 | 7/1984 | Whitmarsh | 301/37 P X |
| 4,458,952 | 7/1984 | Foster et al. | 301/37 P X |

FOREIGN PATENT DOCUMENTS

| | | | |
|---|---|---|---|
| 2451071 | 4/1976 | Fed. Rep. of Germany | 301/37 P |
| 2511306 | 2/1983 | France | 301/37 TP |
| 8115770 | 2/1983 | France | 301/37 TP |
| 55102702 | 6/1980 | Japan | 301/37 TP |
| 499887 | 1/1939 | United Kingdom | 301/37 C |

*Primary Examiner*—David A. Scherbel
*Assistant Examiner*—Carol L. Olson
*Attorney, Agent, or Firm*—Wenderoth, Lind & Ponack

[57] ABSTRACT

A synthetic resin vehicle wheel cover includes first and second mounting elements integrally formed with the cover. The first mounting elements include at least two cylindrical projections which project from the inner surface of the cover with the projections positioned along a circle about the center axis of the cover so that the projections are adapted to fit over and firmly grasp wheel fastening nuts. The second mounting means includes projections which project inwardly from the periphery of the cover so that the projections are adapted to fixedly engage with the tire receiving rim.

1 Claim, 3 Drawing Figures

3'
R
3"
3
W
1
2"
2'
N
2'
2

SYNTHETIC RESIN VEHICLE WHEEL COVER

This application is a continuation of now abandoned application Ser. No. 706,887, filed Mar. 1, 1985 abandoned.

BACKGROUND OF THE INVENTION

This invention relates to a synthetic resin wheel cover with integrally formed mounting means for mounting the cover on a vehicle wheel.

U.S. Pat. No. 4,093,312 discloses vehicle wheel covers having mounting means which include spring means formed separately from the cover and provided on the outer periphery of the covers, the spring means being adapted to resiliently and firmly engage with a tire receiving rim so as to fixedly mount the cover on the wheel. However, since great force is imposed on the spring means when the cover is mounted on the wheel, it is required to make the rigidity of the outer periphery of the cover supporting the spring means great which thereby limits the freedom of design of the covers. Further, such spring means tends to damage the rim whereby the damaged portions will get rusty, and further to cause injury to a person mounting the cover on the wheel. Furthermore, such spring means can not prefectly prevent the cover from being rotated relative to the wheel by the torque imposed on the cover during running of the vehicle.

Japanese Utility Model Public Disclosure No. 53-160138 discloses another type of mounting means for a wheel cover. This mounting means consists of synthetic resin cylindrical projections provided on the rear surface of the cover, which are adapted to receive and firmly grasp nuts which are used to fasten the vehicle wheel and are positioned on the outer surface of the wheel around the hub of the same, whereby the cover is fixedly mounted on the wheel without rotation thereof. However, such covers are limited to half size covers covering only the radially inner half portion of the wheel, because these covers do not have means for fastening the outer periphery of the cover to the rim.

SUMMARY OF THE INVENTION

Accordingly, an object of this invention is to provide a synthetic resin vehicle wheel cover which is adapted to cover the whole of the wheel and which eliminates the defects as described in connection with the wheel of U.S. Pat. No. 4,093,312.

The other object of this invention is to provide a vehicle wheel cover which is made from synthetic resin of a desired color and has first and second mounting means integrally formed with the cover, the first mounting means being adapted to firmly grasp at least two wheel fastening nuts and the second mounting means being adapted to fixedly engage with the tire receiving rim.

The synthetic resin vehicle wheel cover in accordance with the present invention includes first and second mounting means, said first mounting means including at least two cylindrical projections which are adapted to receive and grasp wheel fastening nuts, and said second mounting means including projections which are adapted to fixedly engage with the tire receiving rim.

DETAILED DESCRIPTION OF THE INVENTION

The wheel cover 1 in accordance with an embodiment of this invention, as shown, has a first mounting means comprising four cylindrical projections 2 provided along a first circle about the center axis of the cover on the rear surface of the cover 1, and which are adapted to fit over and firmly grasp the wheel fastening nuts N, and a second mounting means comprising eight plate-like rim-engaging projections 3 provided on the rear surface of the cover 1, which are adapted to engage with a tire receiving rim R.

Figure 1:
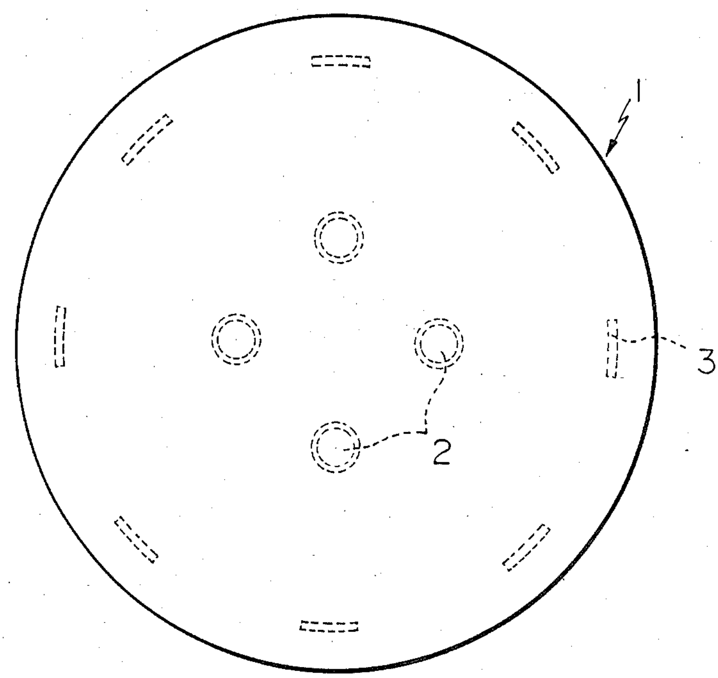
FIG. 1 is a front view of a synthetic resin vehicle wheel cover in accordance with an embodiment of the present invention.
Figure 2:
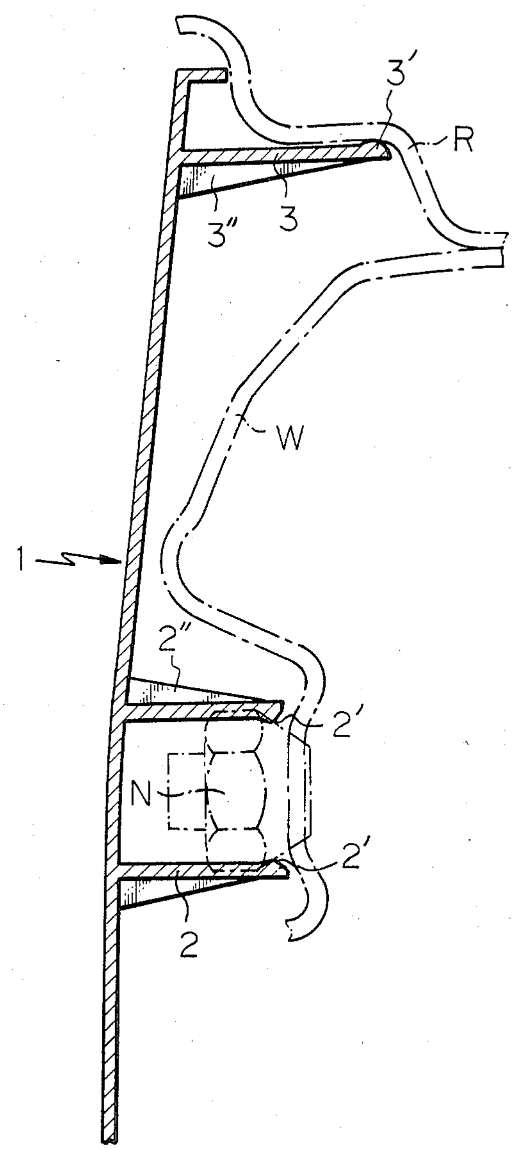
FIG. 2 is a cross sectional view of a portion of the wheel cover of FIG. 1.
Figure 3:
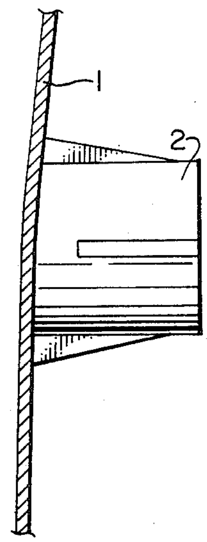
FIG. 3 is a partial cross-sectional view of a cylindrical member on the wheel cover.

Each cylindrical projection 2 has an annular bulge 2' on the free edge of the inner or tip end thereof, which is adapted to engage the nut received in the cylindrical projection to prevent the cylindrical projection from slipping off the nut, and an axial direction slit as seen in FIG. 3 extending from the free end toward the cover 1 to enable the free end to be expanded when the cylindrical projection is inserted onto the nut N. Further, the cylindrical projection has reinforcing ribs 2". The force of the cylindrical projection 2 for grasping the nut is determined by the sizes of the nut receiving hole in the cylindrical projection and slit, hardness and other qualities of the material of the cylindrical projection and so forth.

The plate-like rim-engaging projections 3 of the second mounting means are provided on the periphery of the cover with the rim-engaging projections being circumferentially equally spaced from each other. Each rim-engaging projection 3 has a radially outwardly projecting engaging portion 3' at the tip end of the rim-engaging projection 3, and reinforcing ribs 3". The rim-engaging projections are radially positioned so that, when the cover 1 is mounted on the wheel, the rim-engaging projections 3 are inwardly depressed in the radial direction by the rim R whereby they firmly engage with the rim due to the spring back force thereof.

To mount the wheel cover of the present invention, it is only required to press the cover 1 against the wheel W while aligning the cylindrical projections 2 with the corresponding nuts N.

What is claimed is:

1. A synthetic resin wheel cover comprising:

a generally circular cover body;

a plurality of plate-like rim-engaging projections on the face of said cover body which is to be against a wheel, said projections having a free end and being circumferentially spaced at predetermined distances and integral with and extending from said cover body for elastically engaging the radial inner surface of a wheel rim, each rim-engaging projection having an engaging portion on the free end thereof projecting radially outwardly of said cover body for engaging a corresponding recess in the radial inner surfaces of the wheel rim for preventing said rim-engaging projection from being easily removed from the wheel rim; and at least two nut gripping members on the same face of said cover body as said projections, each consisting of a cylindrical projection integral with said cover body and having a hollow interior and extending from said cover body for engaging with nuts on the wheel, each of said cylindrical projections being resiliently deformable radially outwardly by the nuts as the hollow interior of said cylindrical projection is fitted over the nut and being adapted to clamp the nut by the resilient force of the cylindrical projection, each of said cylindrical projections having an annular bulge at the end remote from said cover body and extending into the hollow interior of said cylindrical projection for preventing said cylindrical projection from being easily removed from the nut, said cover body, said plate-like rim-engaging projection and said cylindrical projections being molded of synthetic resin having sufficient resiliency to provide a spring back force of said rim-engaging projections and said cylindrical projections sufficient to cause the projections to firmly engage with the wheel rim and the nuts so as not to come off the wheel.

* * * * *